June 23, 1953 P. E. GAIRE 2,643,059

SLIDE RULE AND CURSOR WITH HAIRLINE ADJUSTING MEANS

Filed Feb. 19, 1952

INVENTOR.

Paul E. Gaire,

BY [signature]

ATTORNEY

Patented June 23, 1953

2,643,059

UNITED STATES PATENT OFFICE 2,643,059

SLIDE RULE AND CURSOR WITH HAIRLINE ADJUSTING MEANS

Paul E. Gaire, Midland Park, N. J.

Application February 19, 1952, Serial No. 272,440

7 Claims. (Cl. 235—70)

This invention relates to improvements in slide rule components and particularly to improved rule bodies and cursors.

A perfect slide rule, when out of adjustment, often appears to be defective because of rule body and/or cursor mis-alignment. Even though slide rules are accurately adjusted at the factory, handling during shipment, dropping the rule, or even a series of slight jars while laying the rule down during use may loosen the adjusting screws and throw the rule out of alignment.

Having in mind the defects of the prior art apparatus, it is an object of this invention to provide an improved cursor which has its window or windows arranged with means for adjusting them in direct response to actuation of a plurality of adjustable elements, for example, ordinary screws.

Another object of the invention is to provide openings in the end spacers of the cursor beneath the hairlines so that both hairlines are simultaneously visible in order to facilitate aligning the hairlines with each other and one rule index or a specially provided pilot line on the rule body.

A further object of the invention is to provide openings in the rule body with or without a specially provided pilot line, the function of the openings in the rule body being to allow vision through the rule body in order to align the hairlines of the cursor simultaneously.

A still further object of the invention is to provide a slide rule and cursor with adjustable hairline means having simplicity and economy of construction as well as efficiency in operation.

Other objects and features of importance will become apparent in following the description of the illustrated embodiments of the invention.

Figure 5:
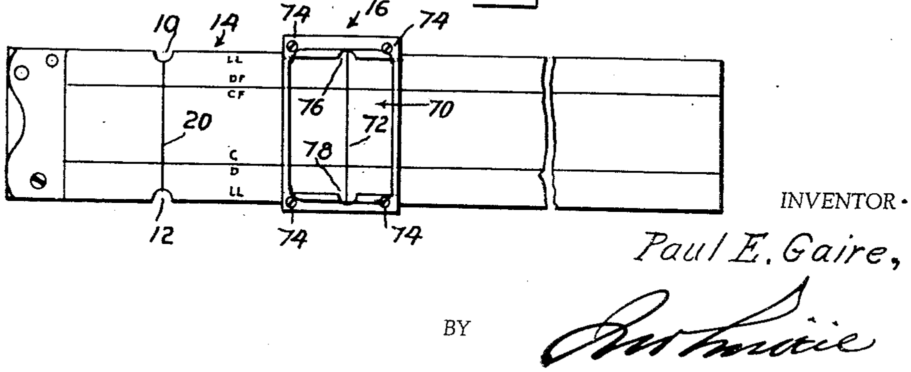
Figure 5 is a fragmentary plan view of a slide rule provided with a pilot line and rule body openings, the use of this rule body being optionally usable with the modified cursor of Figure 5 or Figure 1.

Slide rules which are in common use today require periodic adjustment. It is tedious to adjust the cursor windows for aligning the hairlines with each other and an index on the rule body because usual rule construction requires the alignment of one hairline with an index on one face of the rule and the other hairline with an index on the opposite face of the rule. As shown in Figure 5, I have improved the rule body 14 by providing openings 10 and 12 in opposite edges of the rule body 14 so that when the cursor 16 or 18 is moved to such position that the hairlines are over these openings, both hairlines of each cursor are visible at one time. Instead of having to rely on a number of index markings with which to align the hairlines, a pilot line 20 is provided on the rule body adjacent to the openings 10 and 12. The cursor 16 or 18 may be used on the rule body 14 or, either cursor may be used on a standard rule body.

Figure 1:
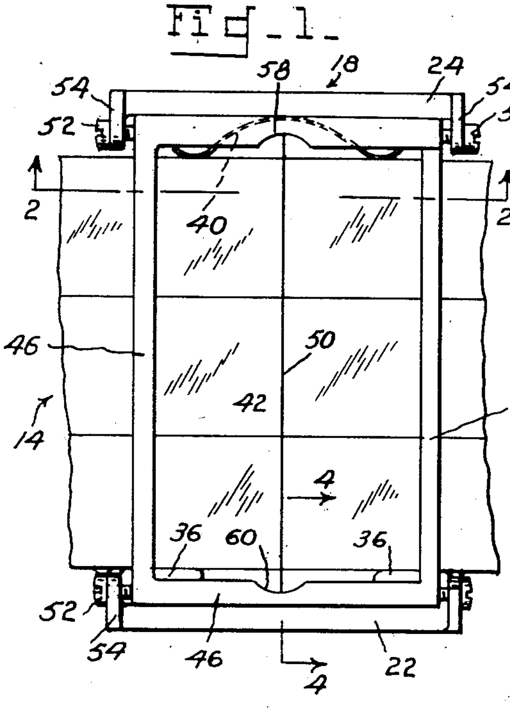
Figure 1 is an elevational view of a cursor exemplifying one form of the invention, the same being shown mounted on a rule which is fragmentarily illustrated.
Figure 2:
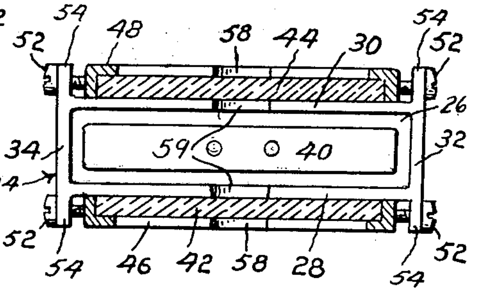
Figure 2 is a transverse sectional view of the cursor taken on the line 2—2 of Figure 1.
Figure 3:
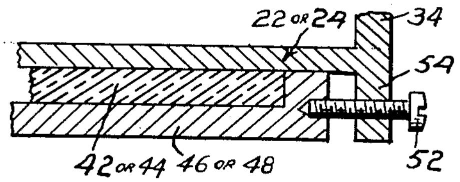
Figure 3 is an enlarged sectional detail of construction showing the means for adjusting one cursor window with respect to the spacers.
Figure 4:
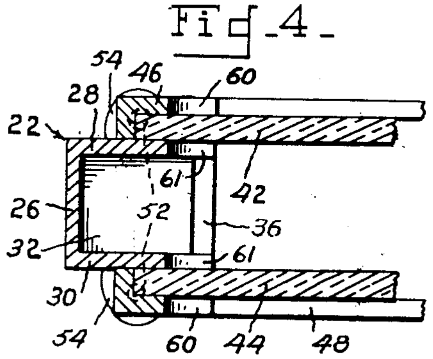
Figure 4 is an enlarged sectional view taken on the line 4—4 of Figure 1, the rule being removed.

Attention is invited to Figures 1–4 where the cursor 18 is shown in detail, and includes a pair of end frame means including runners or spacers 22 and 24, either or both of which may be made of the usual light metal or plastic solid construction, or frame construction as shown in Figures 2 and 4. The spacer 22, as shown in Figure 4, and the spacer 24, as shown in Figure 2, each has a bottom wall 26, side walls 28 and 30 and ends 32 and 34. The spacer 22 has parallel rule edge contacting runner members 36 which extend from the ends 32 and 34, while the spacer 24 is provided with a cursor tension spring 40 which bears against one edge of the rule body and biases the runner members 36 against the other edge of the rule body, as shown in Figure 1.

The vast majority of slide rules are provided with two windows on the cursor, although there are some which use only a single window. The invention is applicable to both styles of slide rule even though the invention finds its greatest utility with the double window variety cursor. Accordingly windows 42 and 44 are shown as a preference in the cursor 18, frames 46 and 48 supporting the windows 42 and 44. The frames 46 and 48 not only support the windows but they also coact with improved means for adjusting the windows and the hairlines 50 thereon in order to align the hairline of each window. This means consists of an adjustable element, as a screw 52 (Fig. 3) carried by an ear 54 at one corner of one of the spacers. The screw 52 is threaded in a tapped opening in one of the frames and has its axis generally parallel to the spacers 22 and 24, hence the path of travel of the cursor 18. There are four screws and four supporting ears on each spacer, two of such assemblies for each window frame on each spacer. Alternatively, the screws may be threaded in the ears and bear on the frames. By use of this arrangement, the windows with their hairlines may be adjusted directly in response to rotation of the screws.

In addition, the frames 46 and 48 are provided at each end with openings, as notches 58 and 60, and the spacers 22 and 24, if necessary, are provided with similar openings, such as notches 59 in the spacer 24 (Figure 2) and the notches 61 in the spacer 22 (Figure 4), directly in line with the ends of the hairlines of the windows 42—44 so that it becomes a simple operation to align the hairlines of the two windows with each other. A person may see, through the notches 58 and 60, both hairlines at one time and adjust the screws 52 until they are in exact alignment with each other instead of relying on separate indices on opposite faces of the slide rule as is the case in a common slide rule in extensive use today.

Reference is now made primarily to Figure 5 where the cursor 16 is somewhat similar to one commonly found on the market. To adjust the windows 70 so as to align the hairlines 72 thereof, the screws 74 (usually telescoping) must be loosened and then the windows manually moved until they are aligned with indices on the rule body. In accordance with the present invention openings 76 and 78 are provided in the spacers of the cursor 16 to allow the two hairlines to be visible simultaneously, especially when these openings are aligned with the rule body openings 10 and 12, at which time the hairlines 72 will appear as end continuations of the pilot line 20 when the hairlines are in proper position.

It is apparent that various changes may be made without departing from the scope of the following claims.

What is claimed is:

1. In a slide rule, a rule body, a cursor comprising a pair of spacers, one spacer having a tension spring adapted to contact the rule body, and the other spacer having a surface adapted to contact the rule body, a pair of windows, means fastening said windows to opposite faces of said spacers, a hairline on each window, and said spacers having vision openings therein intermediate their ends and beneath said hairlines in order to visually determine the alignment of the hairlines, said rule body having a pilot line with which to align said hairlines, and said body having openings therein with which the openings in said spacers are adapted to align.

2. In a slide rule according to claim 1, said window fastening means comprising a pair of oppositely disposed screws on each side of said spacers and engaging opposite sides of said windows, said screws being aligned with said spacers and substantially perpendicular to said hairlines.

3. In a slide rule, a rule body for use with a cursor having hairlines on both sides, a pilot line on said rule body with which to align the cursor hairlines, said body having a notch in each edge thereof and aligned with said pilot lines to enable alignment of both cursor hairlines with said pilot line.

4. In a slide rule, a rule body for use with a cursor having hairlines on both sides, said body having at least one opening therethrough to permit alignment of the cursor hairlines with each other.

5. A slide rule cursor comprising a pair of end frame means for slidably engaging the opposite edges of a slide rule body, a pair of windows for overlying the opposite sides of a slide rule body, a hairline on each window, and means fastening said windows on opposite faces of said end frame means, said end frame means having vision openings therein intermediate their ends and aligned with said hairlines to enable visual alignment of said hairlines when the cursor is mounted on a slide rule body.

6. In a slide rule cursor, a pair of end frame means for slidably engaging the opposite edges of a slide rule body, a pair of windows respectively disposed on opposite faces of said end frame means and overlying the opposite sides of a slide rule body, a hairline on each window, said end frame means having vision openings therein intermediate their ends and aligned with said hairlines to enable visual alignment of said hairlines, and means adjustably securing said windows on said end frame means to enable adjustment of said hairlines into alignment, said securing means including a pair of oppositely disposed screws on each face of said end frame means for respectively engaging the end portion of a window therebetween, said screws being aligned with said end frame means and substantially perpendicular to said hairlines to enable adjustment of said hairlines both angularly and laterally.

7. A slide rule cursor comprising a pair of end frame means for slidably engaging the opposite edges of a slide rule body, a window mounted on and between said end frame means to overlie a side of a slide rule body, a hairline on said window, and means adjustably securing said window on said end frame means to enable adjustment of said hairline into alignment with the graduations on a slide rule body, said securing means including a pair of oppositely disposed screws on each of said end frame means for respectively engaging the opposite end portions of said window therebetween, said screws being aligned with said runners and substantially perpendicular to said hairline to enable adjustment of said hairline both angularly and laterally.

PAUL E. GAIRE.

References Cited in the file of this patent

UNITED STATES PATENTS

| Number | Name | Date |
|---|---|---|
| 1,028,237 | Lurie | June 4, 1912 |
| 2,086,502 | Keuffel | July 6, 1937 |
| 2,342,828 | Armitage et al. | Feb. 29, 1944 |